(12) United States Patent
Abe et al.

(10) Patent No.: US 9,392,520 B2
(45) Date of Patent: Jul. 12, 2016

(54) BASE STATION APPARATUS, MOBILE TERMINAL APPARATUS AND COMMUNICATION CONTROL METHOD

(75) Inventors: Tetsushi Abe, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 233 days.

(21) Appl. No.: 13/995,986

(22) PCT Filed: Dec. 21, 2011

(86) PCT No.: PCT/JP2011/079744
§ 371 (c)(1),
(2), (4) Date: Aug. 2, 2013

(87) PCT Pub. No.: WO2012/086734
PCT Pub. Date: Jun. 28, 2012

(65) Prior Publication Data
US 2014/0003271 A1    Jan. 2, 2014

(30) Foreign Application Priority Data
Dec. 22, 2010   (JP) ................................ 2010 286568

(51) Int. Cl.
*H04W 36/30*   (2009.01)
*H04W 48/08*   (2009.01)
*H04L 5/00*    (2006.01)
(Continued)

(52) U.S. Cl.
CPC .............. *H04W 36/30* (2013.01); *H04L 5/0048* (2013.01); *H04L 5/0094* (2013.01); *H04W 48/08* (2013.01); *H04L 5/0023* (2013.01); *H04W 72/04* (2013.01); *H04W 88/08* (2013.01)

(58) Field of Classification Search
CPC ... H04L 5/0023; H04L 5/0094; H04L 5/0048; H04W 48/08; H04W 88/08; H04W 36/30
See application file for complete search history.

(56) References Cited

U.S. PATENT DOCUMENTS 8,289,917 B1 * 10/2012 Koivisto et al. ............. 370/329
8,428,018 B2 *  4/2013 Noh ..................... H04B 7/0452
                                                    370/208

(Continued)

OTHER PUBLICATIONS

Decision to Grant a Patent issued in Japanese Patent Application No. 2010-286568, mailing date Jul. 2, 2013, with English translation thereof (4 pages).

(Continued)

*Primary Examiner* — Brian D Nguyen
*Assistant Examiner* — Toan Nguyen
(74) *Attorney, Agent, or Firm* — Osha Liang LLP

(57) ABSTRACT

The present invention is designed to transmit and receive reference signals adequately even when the abundance ratio of reference signals in a predetermined period is increased. The present invention provides a base station apparatus that transmits CSI-RSs to the first mobile terminal apparatus which can receive CSI-RSs and to a second mobile terminal apparatus which can receive CSI-RSs that are set in a predetermined period at a lower abundance ratio than the first mobile terminal apparatus, and this base station apparatus allocates CSI-RSs to CSI-RS resource which can be muted at an abundance ratio which allows the first mobile terminal apparatus reception, reports the resources where CSI-RSs are allocated to the first mobile terminal apparatus, and, upon reporting the resources where CSI-RSs are allocated to the second mobile terminal apparatus, reports part of the resources as muted resources.

9 Claims, 13 Drawing Sheets

(51) Int. Cl.
*H04W 72/04* (2009.01)
*H04W 88/08* (2009.01)

(56) References Cited

U.S. PATENT DOCUMENTS

| | | | | |
|---|---|---|---|---|
| 8,559,963 B2 * | 10/2013 | Nishio | ................. | H04L 5/0048 370/329 |
| 2011/0305295 A1 * | 12/2011 | Kim et al. | ..................... | 375/295 |
| 2012/0058791 A1 * | 3/2012 | Bhattad et al. | ................ | 455/509 |
| 2012/0264441 A1 * | 10/2012 | Chandrasekhar et al. | .... | 455/450 |
| 2013/0148515 A1 * | 6/2013 | Ribeiro et al. | ................ | 370/252 |

OTHER PUBLICATIONS

International Search Report issued in PCT/JP2011/079744 mailed on Jan. 31, 2012 (3 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

* cited by examiner

BASE STATION APPARATUS, MOBILE TERMINAL APPARATUS AND COMMUNICATION CONTROL METHOD

TECHNICAL FIELD

The present invention relates to a base station apparatus, a mobile terminal apparatus and a communication control method in a next-generation mobile communication system.

BACKGROUND ART

In a UMTS (Universal Mobile Telecommunications System) network, for the purposes of improving spectral efficiency and improving the peak data rate, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (non-patent literature 1).

In the third-generation mobile communication system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study (for example, LTE-Advanced (LTE-A)). Accordingly, in the future, it is expected that these multiple mobile communication systems will coexist, and configurations (base station apparatus, mobile terminal apparatus, etc.) that are capable of supporting these multiple systems will become necessary.

In the downlink of the LTE system, a CRS (Cell-specific Reference Signal) is defined. This CRS is used to demodulate transmission data, and, besides, used to measure downlink channel quality (CQI: Channel Quality Indicator) for scheduling and adaptive control, and furthermore used to measure an average downlink propagation path state for cell search and handover (mobility measurement). Meanwhile, in the downlink of a successor system of LTE (LTE-A system), a CSI-RS (Channel State Information-Reference Signal) is under study for dedicated use of CSI (Channel State Information) measurement.

CITATION LIST

Non-Patent Literature

Non-Patent Literature 1: 3GPP, TR 25.912 (V7.1.0), "Feasibility Study for Evolved UTRA and UTRAN," September 2006

SUMMARY OF INVENTION

Technical Problem

Now, the CSI-RS is used only in CSI measurement, so that, compared to the RS to be used in data demodulation and so on, its abundance ratio (density) in a predetermined period is set low. In future systems, need for further improvement of the accuracy of measurement by increasing the abundance ratio of reference signals such as the CSI-RS and so on is anticipated.

The present invention has been made in view of the above, and it is therefore an object of the present invention to provide a base station apparatus, a mobile terminal apparatus and a communication control method, whereby it is possible to transmit and receive reference signals adequately even when the abundance ratio of reference signals in a predetermined period is increased.

Solution to Problem

A base station apparatus according to the present invention is a base station apparatus to transmit reference signals to a first mobile terminal apparatus which can receive a reference signal for measuring a channel state, and to a second mobile terminal apparatus which can receive a reference signal that is set in a predetermined period at a lower abundance ratio than the first mobile terminal apparatus, and this base station apparatus has: a reference signal allocation section that allocates the reference signals, to reference signal resources which are defined for transmission of the reference signals and which can be muted, at an abundance ratio which allows the first mobile terminal apparatus reception; and a reference signal reporting section that reports resources where the reference signals are allocated, to the first mobile terminal apparatus, and that, when reporting the resources where the reference signals are allocated, to the second mobile terminal apparatus, reports part of the resources as resources to be muted.

Advantageous Effects of Invention

According to the present invention, the first mobile terminal apparatus is able to receive reference signals that are allocated at a high abundance ratio in a predetermined period and measure the channel state with high accuracy. Also, a second mobile terminal apparatus is able to disregard the reference signals of muted resources, among the reference signals that are allocated at an abundance ratio which the first mobile terminal apparatus is able to receive, and measure the channel state. Consequently, the second mobile terminal apparatus is not influenced by the increase of reference signals. In this way, even when the abundance ratio of reference signals is increased in a predetermined period, it is possible to receive the reference signals adequately.

DESCRIPTION OF EMBODIMENTS

First, the CSI-RS, which is one of the reference signals adopted in a successor system of the LTE system, will be described with reference to FIG. 1. The CSI-RS is a reference signal to be used in CSI measurement of CQIs (Channel Quality Indicators), PMIs (Precoding Matrix Indicators), RIs (Rank Indicators) and so on, as the channel state. Unlike CRSs that are allocated to all subframes, CSI-RSs are allocated in a predetermined cycle—for example, in a ten-subframe cycle. Furthermore, a CSI-RS is specified by parameters such as position, sequence and transmission power. The position of a CSI-RS includes subframe offset, cycle and subcarrier-symbol offset (CSI-RS indices).

In one resource block defined in LTE, CSI-RSs are allocated not to overlap control signals such as the PDCCH (Physical Downlink Control Channel) and so on, user data such as the PDSCH (Physical Downlink Shared Channel) and so on, and other reference signals such as the CRS (Cell-specific Reference Signal), the DM-RS (Demodulation-Reference Signal) and so on. One resource block is formed with twelve subcarriers that are consecutive in the frequency direction and fourteen symbols that are consecutive in the time axis direction. From the perspective of suppressing PAPR, resources that can transmit CSI-RSs are allocated two resource elements that neighbor each other in the time axis direction as a set.

In the CSI-RS configurations shown in FIG. 1, forty resource elements are secured as CSI-RS resources (reference signal resources). In these forty resource elements, CSI-RS patterns are set in accordance with the number of CSI-RS ports (the number of antennas). In each CSI-RS pattern, for every one CSI-RS port, one resource element is set for the CSI-RS. When the number of CSI-RS ports is two, CSI-RSs are allocated to two resource elements, among forty resource elements. Consequently, in FIG. 1A, twenty CSI-RS patterns represented by indices #0-#19 (CSI configurations=0-19) are set. Here, for ease of explanation, the same index is assigned to the resource elements constituting one pattern.

Figure 1A:
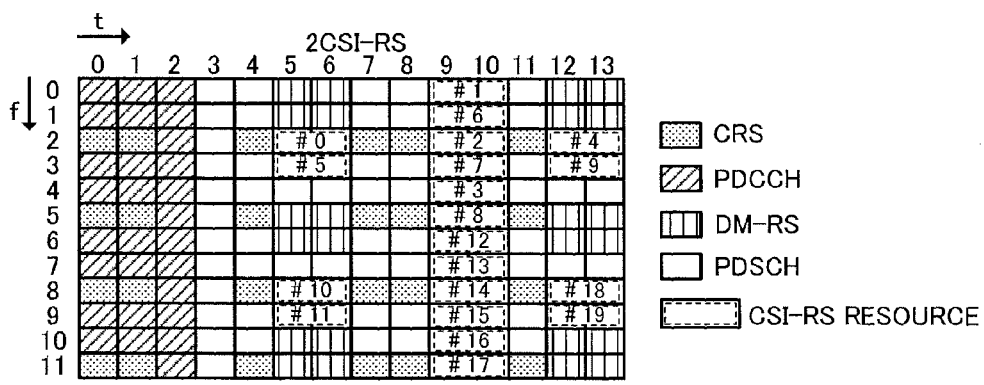
FIG. 1 provides diagrams to explain CSI-RS allocation patterns in resource blocks.
Figure 1B:
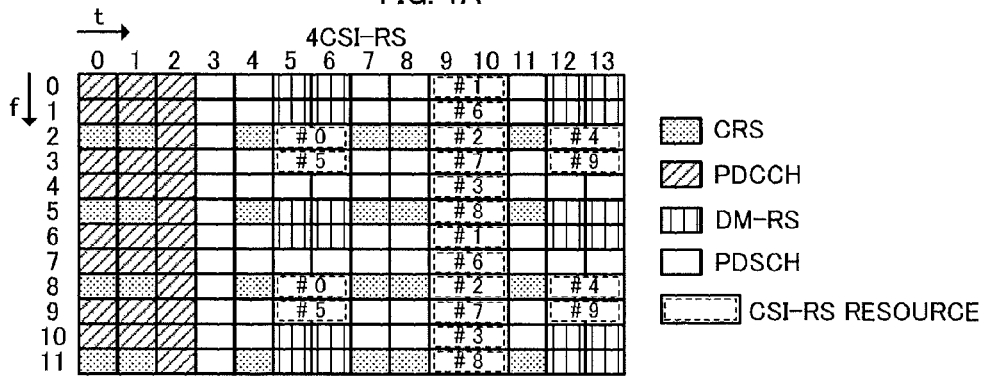
Figure 1C:
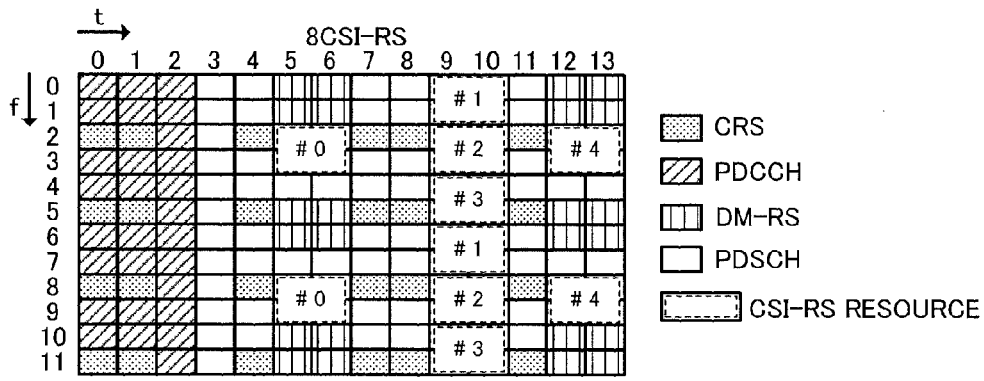

When the number of CSI-RS ports is four, CSI-RSs are allocated to four resource elements, among forty resource elements. Consequently, in FIG. 1B, ten patterns of CSI-RS patterns represented by indices #0-#9 (CSI configurations=0-9) are set. When the number of CSI-RS ports is eight, CSI-RSs are allocated to eight resource elements, among forty resource elements. Consequently, as shown in FIG. 1C, five patterns of CSI-RS patterns represented by indices #0-#4 (CSI configurations=0-4) are set. Note that, in the CSI-RS patterns, user data is allocated to the resource elements where CSI-RSs are not allocated.

Figure 1D:
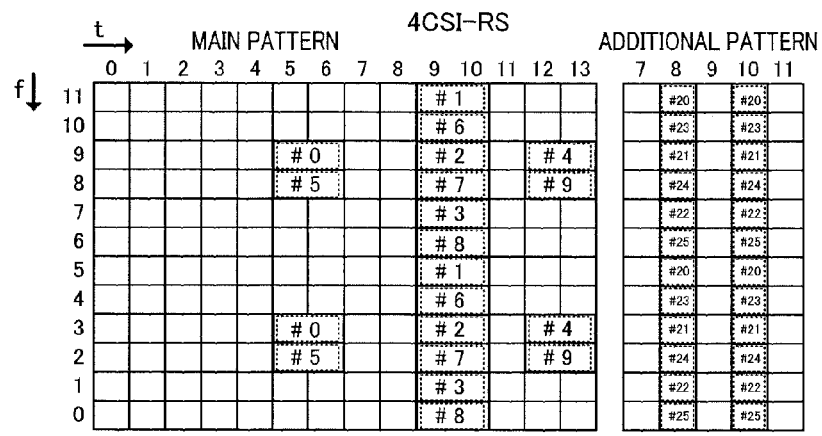

Then, with the CSI-RSs, a different CSI-RS pattern (CSI Configuration) is selected for every cell, thereby preventing interference between cells. Also, the CSI-RS patterns may be a pattern to which TDD patterns are added as an FDD option as shown in FIG. 1D, besides the FDD normal patterns shown in FIG. 1A to FIG. 1C. Furthermore, extended patterns (not shown), which enhance the FDD normal patterns, may be used as well. In the following description, examples of FDD normal patterns will be described for ease of explanation.

Figure 2A:
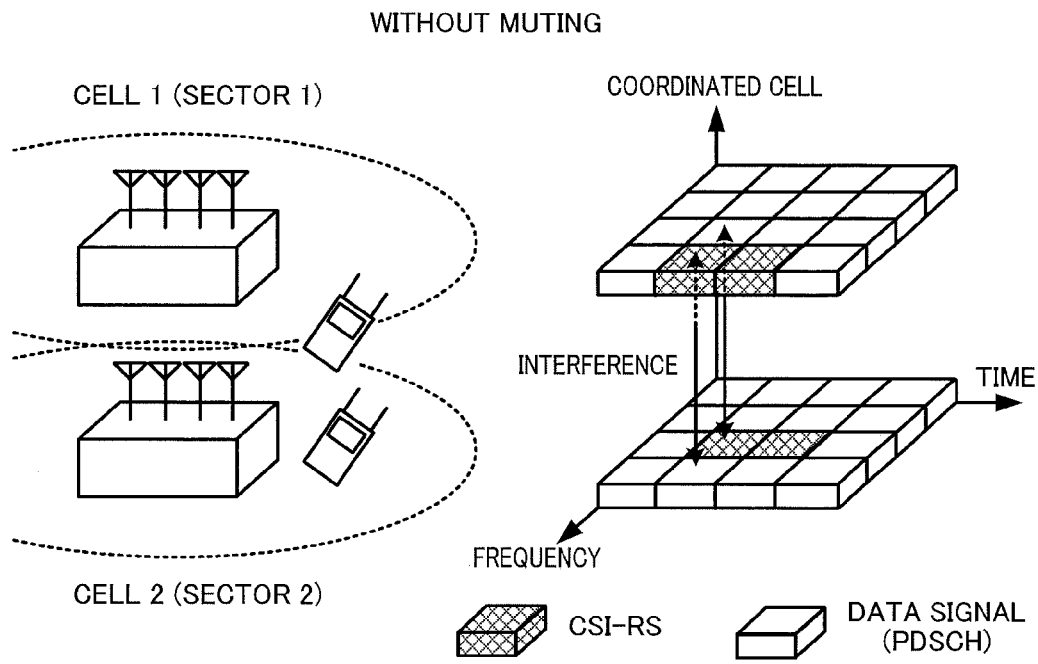
FIG. 2 provides diagrams to explain muting in CQI measurement using CSI-RSs.

Now, in CSI measurement using CSI-RSs, cases might occur where the accuracy of measurement is damaged by data interference from neighboring cells. For example, as shown in FIG. 2A, user data is allocated to a downlink resource block of cell C1 in a way to meet a CSI-RS of its neighboring cell C2. Also, user data is allocated to a downlink resource block of cell C2 in a way to meet a CSI-RS of its neighboring cell C1. Such user data constitutes interference components against CSI-RSs in each cell, and become a factor to damage the accuracy of CSI measurement in a mobile terminal apparatus that is located in a border between cell C1 and cell C2.

Figure 2B:
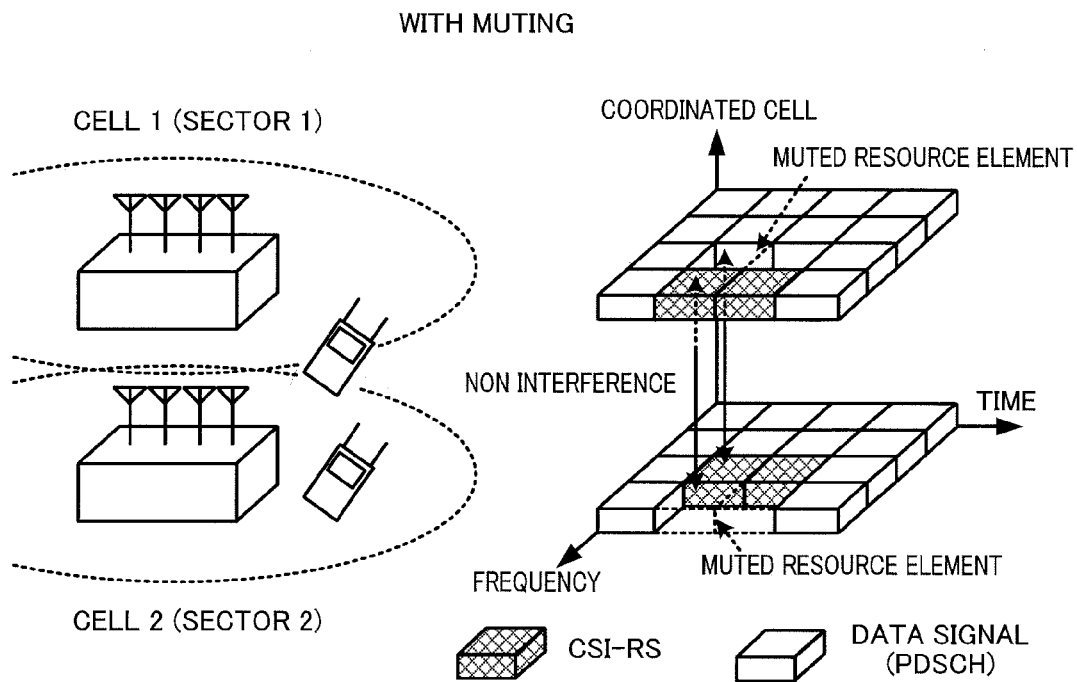

To improve the deterioration of the accuracy of CSI measurement due to the positions where user data is allocated, muting is under study. In muting, as shown in FIG. 2B, user data is not allocated to the resources corresponding to the CSI-RSs of neighboring cells. Downlink resource blocks of cell C1 are muted in accordance with the CSI-RSs of cell C2. Also, downlink resource blocks of cell C2 are muted in accordance with the CSI-RSs of cell C1.

By means of this configuration, the accuracy of CSI measurement in a mobile terminal apparatus is improved by eliminating interference components against CSI-RSs due to user data of neighboring cells. When muting is applied mutually between neighboring cells, the data channel of the subject cell is not transmitted for the neighboring cell, and therefore it is necessary to report the positions of muting resources to the mobile terminal apparatus. This is because rate matching is performed in the base station apparatus to avoid the resources to be muted, and therefore the mobile terminal apparatus has to identify the resources to be muted and perform de-rate matching. If the mobile terminal apparatus fails to identify the resources to be muted, the demodulation process is applied to the resources to be muted as well, and therefore the throughput of the demodulation process and the accuracy of demodulation are deteriorated.

Note that the resources to be muted may be defined as resources where no data is allocated, or may be defined as resources where data is allocated to an extent where interference is not given against the CSI-RSs of neighboring cells. Furthermore, resources that are muted may be defined as resources to be transmitted by transmission power not to give interference against the CSI-RSs of neighboring cells.

When a base station apparatus reports muting to a mobile terminal apparatus, the base station apparatus performs the reporting using CSI-RS patterns. In this case, muting may be reported in a bitmap format in which the indices (CSI configurations) by which the CSI-RS patterns are numbered, and whether or not muting is applied, are associated on a one-by-one basis. Also, CSI-RS patterns of varying numbers of CSI-RS ports may be used between reporting of muting and reporting of CSI-RSs.

Figure 3:
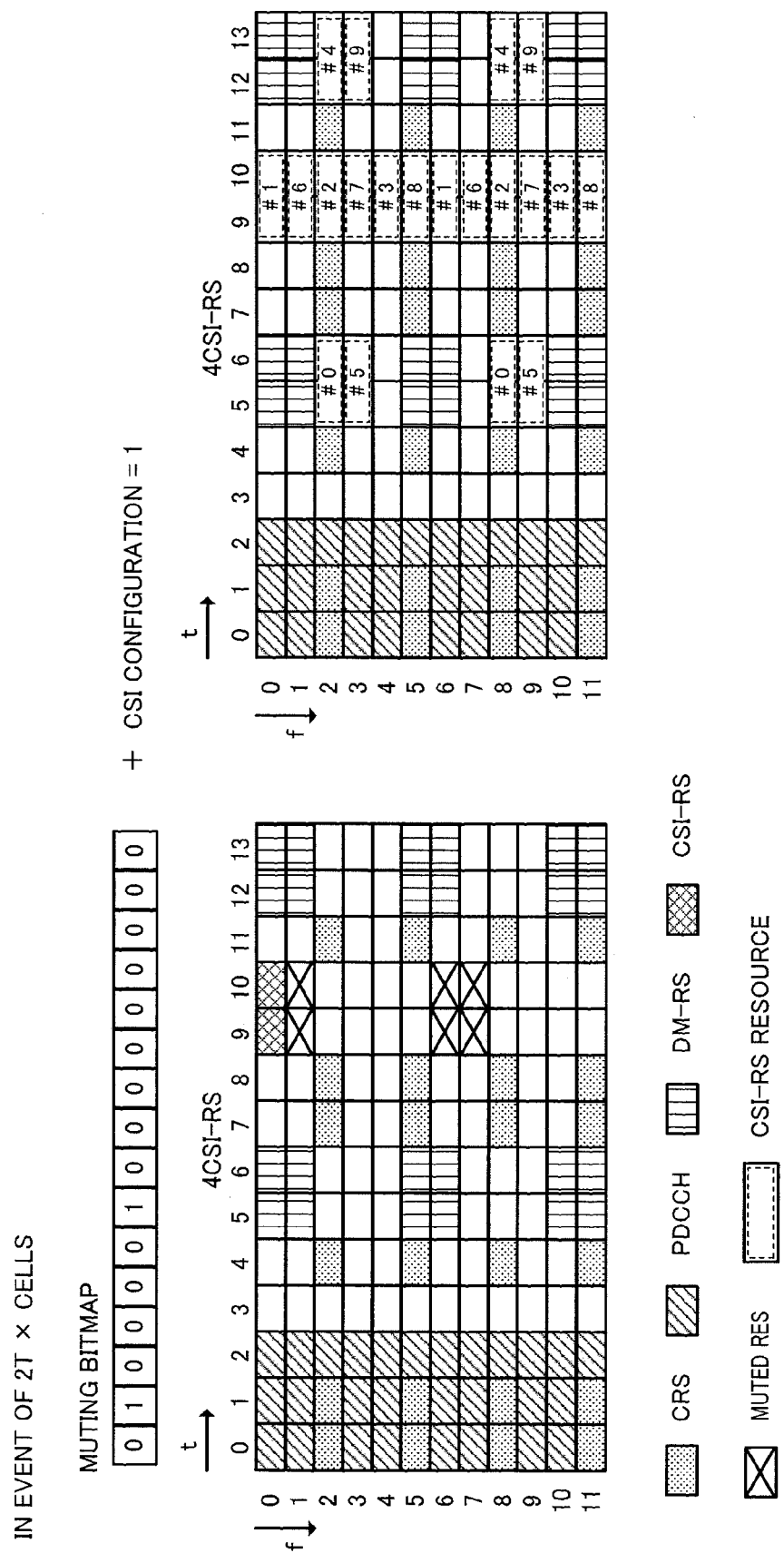
FIG. 3 provides diagrams to show examples of a muting reporting method.

FIG. 3 shows an example of reporting muting using the CSI-RS patterns used when the number of CSI-RS ports is four. Here, muting is set in the CSI-RS resources designated by indices #1 and #6 (CSI Configurations=1 and 6). In this case, sixteen-bit bitmap information [0100001000000000] is reported in association with the indices [#0-#9, #20-#25] (CSI configurations=0-9 and 20-25), where TDD additional patterns are added to the FDD normal patterns shown in FIG. 1D. In the bitmap information, "1" is set in the resources to be muted, and "0" is set in the resources that are not muted. Also, besides the bitmap information, the base station apparatus reports the transmission period (duty cycle) and subframe offset, to a mobile terminal apparatus.

Also, in FIG. 3, CSI-RSs are reported using the CSI-RS patterns used when the number of CSI-RS ports is two. Here, CSI-RSs are allocated to the CSI-RS resources designated by index #1 (CSI configuration=1) in FIG. 1A. Consequently, among the muting resources indicated in the bitmap information, muting is set except for the resources where CSI-RSs are allocated. Besides the muting information, the base station apparatus reports the resources where CSI-RSs are allocated, to the mobile terminal apparatus.

Now, as mentioned earlier, CSI-RSs are transmitted in a long cycle (once every plurality of subframes), compared to the CRS and so on. Also, CSI-RSs are allocated one resource element for every one CSI-RS port, so that, compared to the CRS and so on, the number of resource elements to be allocated is small. This is because, compared to the reference signals that are required for channel estimation to be used in data demodulation, the number of reference signals (density, abundance ratio, etc.) per radio resource required for CSI measurement is set low. In this way, since the number of CSI-RSs per radio resource is small, when feedback of high accuracy from a mobile terminal apparatus is required in a future system, there is a possibility that the mobile terminal apparatus is unable to perform sufficient channel estimation.

Figure 4:
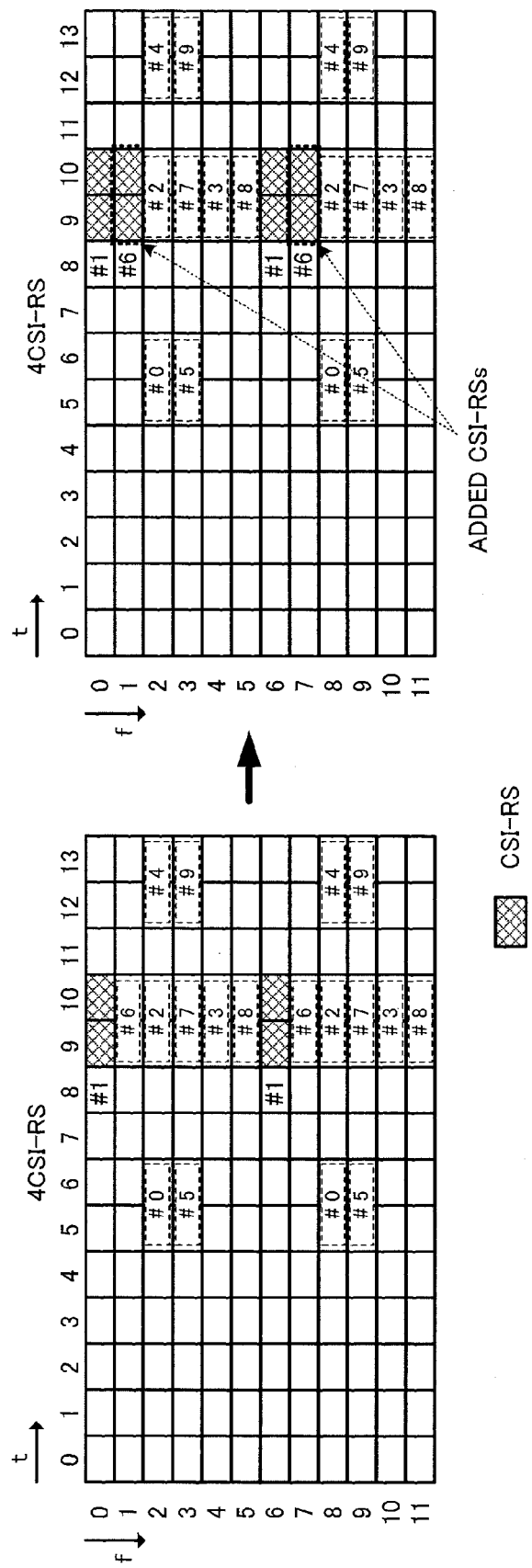
FIG. 4 is a diagram to show an example of a CSI-RS arrangement configuration when the abundance ratio is increased.

To solve this problem, as shown in FIG. 4, it may be possible to simply increase the number of CSI-RSs and increase the abundance ratio (density) of CSI-RSs in one radio resource. However, although a new mobile terminal apparatus that supports the increase of the abundance ratio is able to receive CSI-RSs from the base station apparatus, an existing mobile terminal apparatus is unable to recognize the additional CSI-RSs and suffers interference upon user data demodulation.

For example, in the example of FIG. 4, when the number of CSI-RS ports is four, CSI-RSs are allocated to the CSI-RS resources designated by index #1 (CSI configuration=1), in addition to the CSI-RS resources designated by index #6 (CSI configuration=6). As for the new mobile terminal apparatus, for example, it is possible to allow the new mobile terminal apparatus to receive the CSI-RSs of indices #1 and #6 (CSI configurations=1 and 6) by defining new CSI-RS patterns. Meanwhile, as for the existing mobile terminal apparatus, since it is not possible to define new CSI-RS patterns, it is not possible to allow the existing mobile terminal apparatus to recognize the CSI-RS of index #6 (CSI configuration=6).

The present inventors have arrived at the present invention in order to solve this problem. That is, a gist of the present invention is to report the resources where additional CSI-RSs are allocated, together with the existing CSI-RSs, to the new mobile terminal apparatus, and report the resources where the existing CSI-RSs are allocated, not including the additional CSI-RSs, by muting, to the existing mobile terminal apparatus. By this means, it is possible to increase the abundance ratio of CSI-RSs, and allow the new mobile terminal apparatus to measure CSI-RSs with high accuracy, without causing negative influence on the existing mobile terminal apparatus.

Now, the method of signaling CSI-RS position information according to the present embodiment will be described. FIG. 5 provides diagrams to show examples of a CSI-RS position information signaling method. Note that, in the following description, a new mobile terminal apparatus will be explained as "the first mobile terminal apparatus" and an existing mobile terminal apparatus will be described as "the second mobile terminal apparatus." Also, assume that the first mobile terminal apparatus and the second mobile terminal apparatus are located in the same cell. Note that, although, in the following description, the abundance ratio of CSI-RSs in one resource block will be described, as long as the abundance ratio of CSI-RSs in one radio resource is given, for example, the abundance ratio of CSI-RSs in a plurality of subframes, the abundance ratio of CSI-RSs in one radio frame, and so on, may be used as well.

Figure 5A:
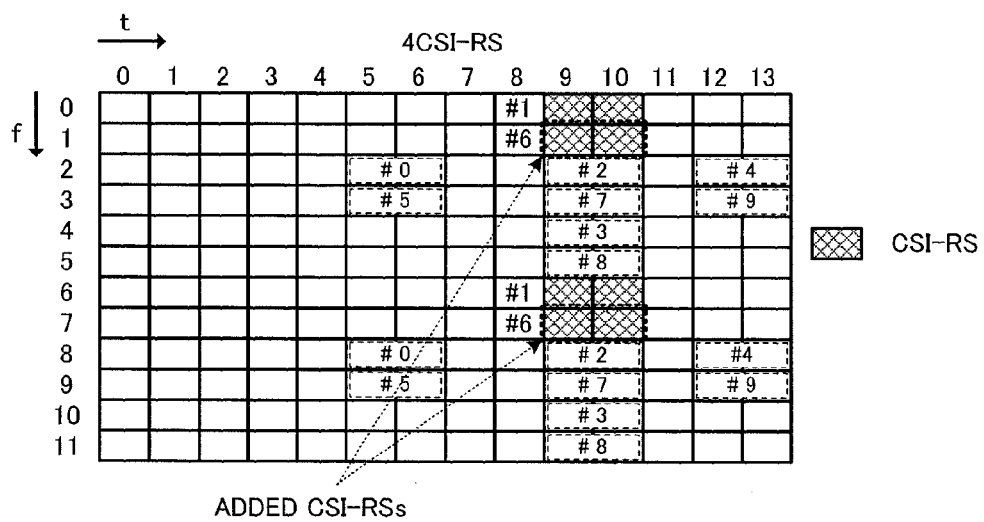
FIG. 5 provides diagrams to show examples of a CSI-RS position information signaling method.

FIG. 5A shows an example of CSI-RS allocation with respect to the first mobile terminal apparatus. Here, in one resource block, forty resource elements are secured as CSI-RS resources. Also, two resource elements are allocated for CSI-RSs for every one CSI-RS port, and thus the abundance ratio of CSI-RSs in one resource block is increased. In the example illustrated, when the number of CSI-RS ports is four, CSI-RSs are allocated to the resources designated by index #6 (CSI configuration=6), in addition to index #1 (CSI configuration=1).

In this way, the first mobile terminal apparatus is able to receive two CSI-RSs for every one CSI-RS port, in one resource block. The base station apparatus reports all the resources where CSI-RSs are allocated, to the first mobile terminal apparatus. By this means, the first mobile terminal apparatus is able to measure CSI with high accuracy. Note that, additional CSI-RSs are allocated to avoid the CSI-RSs of neighboring cells, in order to reduce the inter-cell interference of the CSI-RSs. In this case, CSI-RS position information between cells may be defined in advance between neighboring base station apparatuses or may be changed dynamically between neighboring base station apparatuses.

Figure 5B:
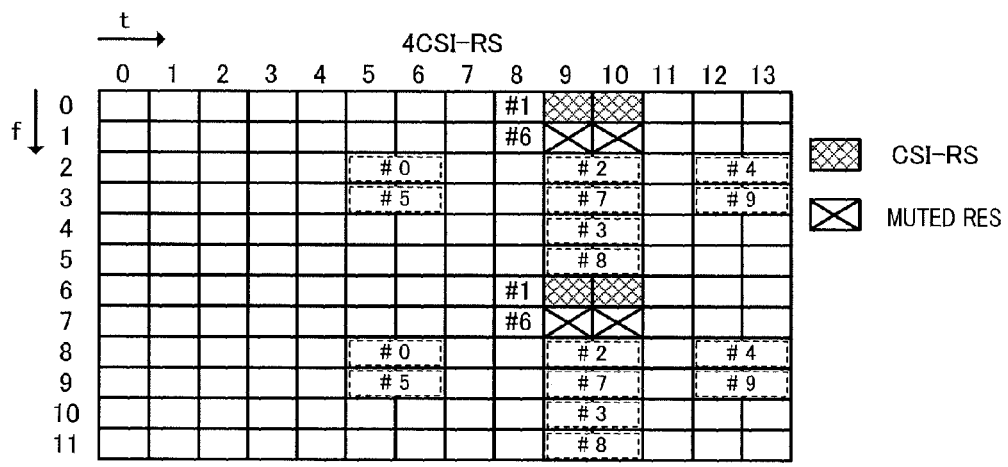

Meanwhile, as shown in FIG. 5B, the second mobile terminal apparatus is able to receive one CSI-RS for every one CSI-RS port, in one resource block. Consequently, the second mobile terminal apparatus is unable to receive all the CSI-RSs that are allocated in a resource block. So, the base station apparatus reports the resources where additional CSI-RSs are allocated as resources to be muted, to the second mobile terminal apparatus. In the example illustrated, when the number of CSI-RS ports is four, the resources designated by index #6 (CSI configuration=6) are reported as resources to be muted.

In this case, the resources designated by index #6 (CSI configuration=6) are in fact allocated CSI-RSs, but nevertheless are recognized as resources to be muted, by the second mobile terminal apparatus. Consequently, the second mobile terminal apparatus disregards the CSI-RSs allocated to the resources designated by index #6 (CSI configuration=6), and receives only the CSI-RSs allocated to the resources designated by index #1 (CSI configuration=1). Also, the second mobile terminal apparatus disregards the CSI-RSs designated by index #6 (CSI configuration=6) upon demodulation of user data, and therefore the accuracy and throughput of user data demodulation do not decrease.

Note that, with the present embodiment, CSI-RS position information is reported from a base station apparatus to a mobile terminal apparatus by the first reporting method and a second reporting method. The first reporting method is a method of reporting CSI-RS position information from a base station apparatus to the first and second mobile terminal apparatuses separately. The second reporting method is a method of reporting CSI-RS position information from a base station apparatus to the first and second mobile terminal apparatuses together.

Figure 5C:
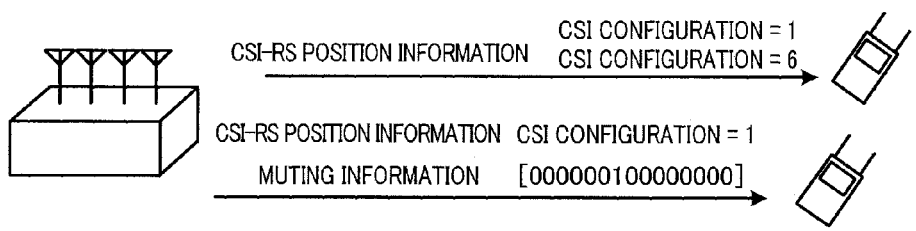

As shown in FIG. 5C, with the first reporting method, the base station apparatus reports CSI-RS position information to the first mobile terminal apparatus individually. Furthermore, the base station apparatus, upon reporting CSI-RS position information to the second mobile terminal apparatus individually, reports muting information, instead of position information of additional CSI-RSs. In this case, the base station apparatus performs the reporting using the above-described CSI-RS patterns.

For example, the base station apparatus may report the resources where CSI-RSs are allocated, to the first and second mobile terminal apparatuses, separately, by CSI configuration, which represent CSI-RS patterns. In the example shown in FIG. 5, ten patterns of CSI-RS patterns are shown, so that ten patterns of CSI configurations are used to report each CSI-RS position information. The base station apparatus reports the CSI configurations=1 and 6, representing indices #1 and #6, to the first mobile terminal apparatus, as CSI-RS position information. Also, the base station apparatus reports the CSI configuration=1, which represents index #1, to the second mobile terminal apparatus, and also reports muting information.

In this case, the base station apparatus may report muting information to the second mobile terminal apparatus individually, in the above-described bitmap format. The base station apparatus reports sixteen-bit bitmap information [0000001000000000], as muting information, in association with the indices [#0-#9 and #20-#25] (CSI configurations=0-9 and 20-25), where additional patterns are added to normal patterns. In the bitmap information, "1" is set in the resources to be muted, and "0" is set in the resources not to be muted. Note that, in bitmap information, it is equally possible to set "0" in muting resources and set "1" in resources that are not muted. Also, although the bitmap information is formed with sixteen bits, it is equally possible to form the bitmap information with ten bits, which do not include the additional patterns.

Figure 5D:
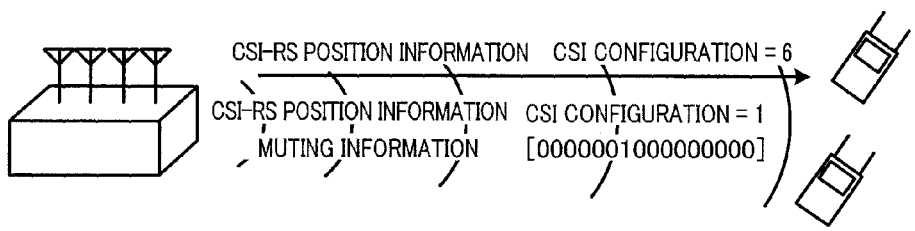

Also, as shown in FIG. 5D, with the second reporting method, the base station apparatus reports muting information, instead of position information of additional CSI-RSs, upon reporting CSI-RS position information to the first and second mobile terminal apparatuses together. Furthermore, the base station apparatus reports the position information of additional CSI-RSs only to the first mobile terminal apparatus, individually. In this case, the base station apparatus performs the reporting using the above-described CSI-RS patterns.

For example, the base station apparatus may report the resources where CSI-RSs are arranged, to the first and second mobile terminal apparatuses, by CSI configurations representing CSI-RS patterns. In the example shown in FIG. 5, the base station apparatus reports the CSI configuration=1, which represents index #1, to the first and second mobile terminal apparatuses. Also, the base station apparatus may report the muting information to the first and second mobile terminal apparatuses together, in the above-described bitmap format. In this case, the base station apparatus reports sixteen-bit bitmap information [0000001000000000] as muting information.

Furthermore, the base station apparatus may report the resources where additional CSI-RSs are arranged, to the first mobile terminal apparatus, by CSI configurations, which represent CSI-RS patterns. In the example shown in FIG. 5, the base station apparatus reports the CSI configuration=6, which represents index #6, to the first mobile terminal apparatus.

Also, with the first and second reporting methods, the base station apparatus reports the transmission period (duty cycle), subframe offset, and so on, besides the resources where CSI-RSs are arranged, and muting resources, to the first and second mobile terminal apparatuses. Also, these CSI-RS position information and so on may be reported by higher layer signaling or may be reported by a broadcast channel, a control channel, a data channel and so on.

Also, the first and second reporting methods are by no means limited to the above methods. For example, the base station apparatus may also report CSI-RS position information to the first and second mobile terminal apparatuses in a bitmap format. Also, the base station apparatus may report muting information to the first and second mobile terminal apparatuses in CSI configurations, which represent CSI-RS patterns.

Figure 6:
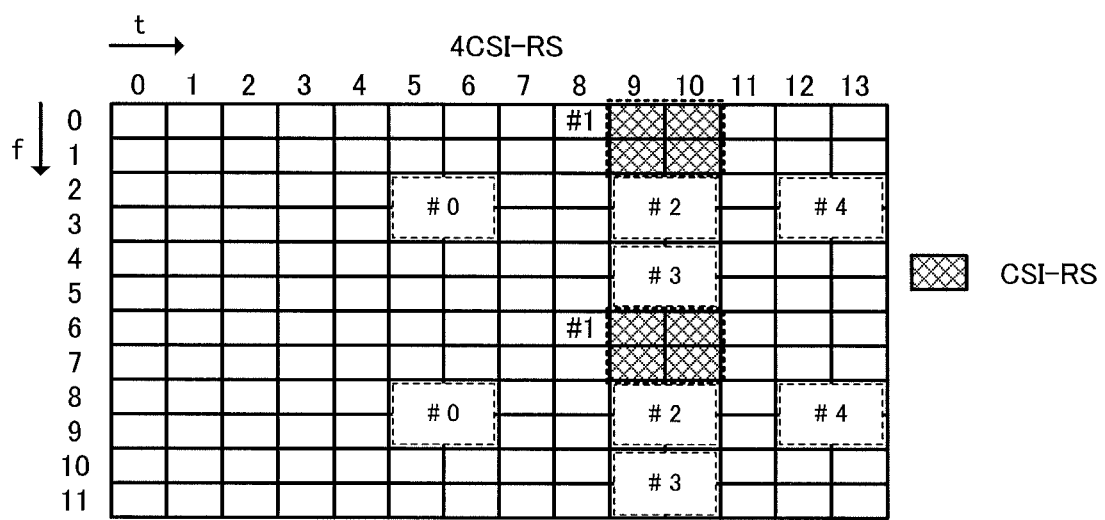
FIG. 6 is a diagram to show a modified example of a CSI-RS pattern.

Also, as shown in FIG. 6, CSI-RS patterns may be newly defined. For example, when the number of CSI-RS ports is four, it is possible to set the five patterns of CSI-RS patterns designated by indices #0-#4 (CSI configurations=0-4). By this means, it is possible to reduce the amount of CSI-RS signaling from the base station apparatus significantly. Also, the indices by which the CSI-RS patterns shown in FIG. 5 and FIG. 6 are numbered are only examples, and may be changed as appropriate. Furthermore, although FIG. 5 and FIG. 6 show examples where the number of CSI-RS ports is four, signaling is also possible by the same method even when the number of CSI-RS ports is two and eight.

Note that the first mobile terminal apparatus is by no means limited to a new mobile terminal apparatus, and, as long as being compatible with CSI-RSs that are transmitted at a high abundance ratio in one radio resource, may be, for example, an existing mobile terminal apparatus as well. Also, the second mobile terminal apparatus is by no means limited to an existing mobile terminal apparatus, and, as long as being compatible with CSI-RSs that are transmitted at a lower abundance ratio than the first mobile terminal apparatus, may be, for example, a new mobile terminal apparatus as well.

Figure 7:
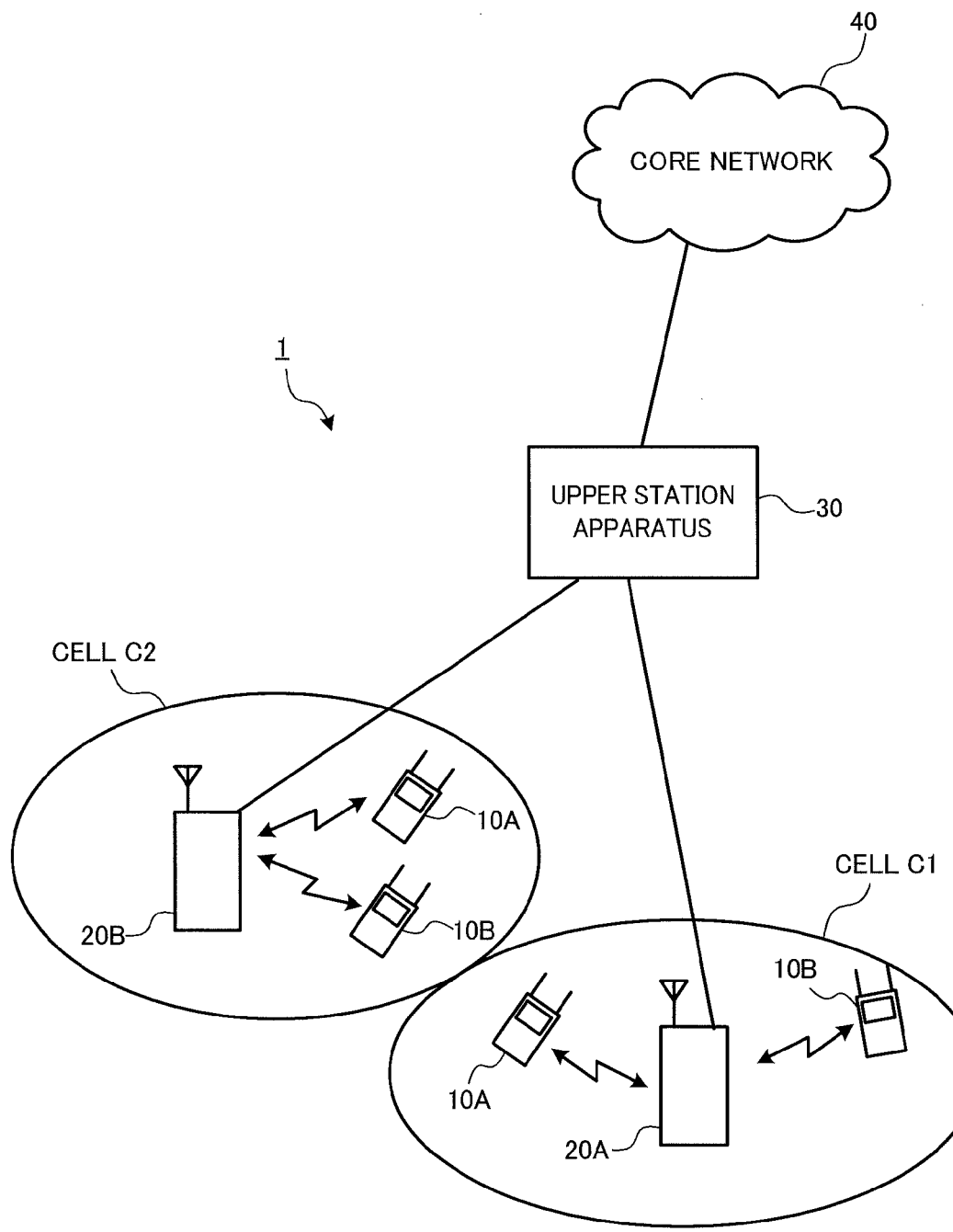
FIG. 7 is a diagram to explain a system configuration of a radio communication system.

Now, a radio communication system according to an embodiment of the present invention will be described in detail. FIG. 7 is a diagram to explain a system configuration of a radio communication system according to the present embodiment. Note that the radio communication system shown in FIG. 7 is a system to accommodate, for example, the LTE system or SUPER 3G. In this radio communication system, carrier aggregation, which groups a plurality of fundamental frequency blocks into one, where the system band of the LTE system is one unit, is used. Also, this radio communication system may be referred to as IMT-Advanced or may be referred to as 4G.

As shown in FIG. 7, a radio communication system 1 is configured to include base station apparatuses 20A and 20B, and a plurality of first and second mobile terminal apparatuses 10A and 10B which communicate with the base station apparatuses 20A and 20B. The base station apparatuses 20A and 20B are connected with an upper station apparatus 30, and this upper station apparatus 30 is connected with a core network 40. Also, the base station apparatuses 20A and 20B are connected with each other by wire connection or by wireless connection. The first and second mobile terminal apparatuses 10A and 10B are able to communicate with the base station apparatuses 20A and 20B in cells C1 and C2. Note that the upper station apparatus 30 includes, for example, an access gateway apparatus, a radio network controller (RNC), a mobility management entity (MME) and so on, but is by no means limited to these.

Although the first and second mobile terminal apparatuses 10A and 10B include LTE terminals and LTE-A terminals, in the following description, simply the first and second mobile terminal apparatuses will be described, unless specified otherwise. Also, although the first and second mobile terminal apparatuses 10A and 10B perform radio communication with the base station apparatuses 20A and 20B for ease of explanation, more generally, user apparatuses (UE: User Equipment) including mobile terminal apparatuses and fixed terminal apparatuses may be used as well.

In the radio communication system 1, although, as radio access schemes, OFDMA (Orthogonal Frequency Division Multiple Access) is applied to the downlink and SC-FDMA (Single-Carrier Frequency-Division Multiple Access) is applied to the uplink, the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Now, communication channels will be described. Downlink communication channels include a PDSCH (Physical Downlink Shared CHannel) as a downlink data channel used by the first and second mobile terminal apparatuses 10A and 10B on a shared basis, and downlink L1/L2 control channels (PDCCH, PCFICH, PHICH). Transmission data and higher control information are transmitted by means of the PDSCH. PDSCH and PUSCH scheduling information is transmitted by the PDCCH (Physical Downlink Control CHannel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel).

Uplink communication channels include a PUSCH (Physical Uplink Shared CHannel) that is an uplink data channel used by each mobile terminal apparatus on a shared basis, and a PUCCH (Physical Uplink Control CHannel), which is an uplink control channel. Transmission data and higher control information are transmitted by means of this PUSCH. Also, by means of the PUCCH, downlink radio quality information (CQI: Channel Quality Indicator), ACK/NACK and so on are transmitted.

Figure 8:
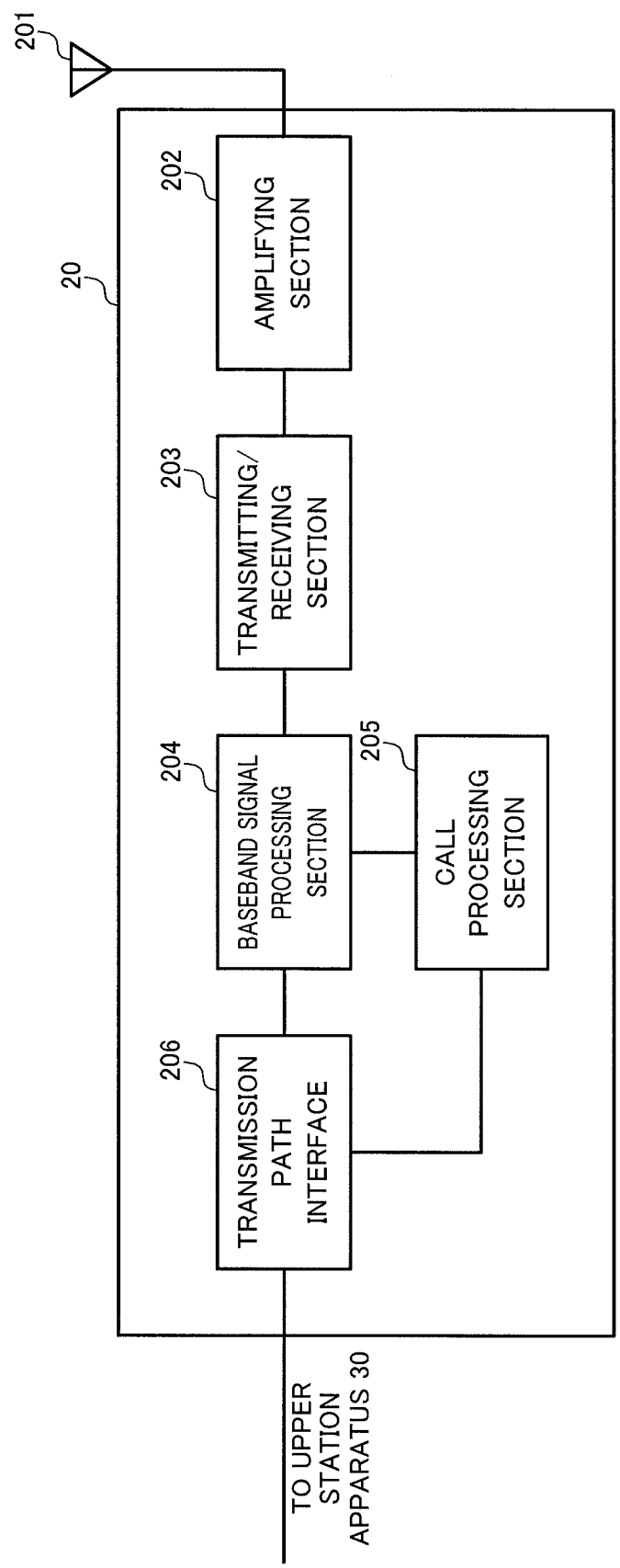
FIG. 8 is a diagram to explain an overall configuration of a base station apparatus.

Referring to FIG. 8, an overall configuration of a base station apparatus according to the present embodiment will be described. Note that the base station apparatuses 20A and 20B have the same configuration and therefore will be described as "base station apparatus 20." Also, the first and second mobile terminal apparatuses 10A and 10B have the same configuration and will be described simply as "mobile terminal apparatus 10." The base station apparatus 20 includes a transmitting/receiving antenna 201, an amplifying section 202, a transmitting/receiving section (reporting section) 203, a baseband signal processing section 204, a call processing section 205, and a transmission path interface 206. Transmission data that is transmitted from the base station apparatus 20 to the mobile terminal apparatus 10 on the downlink is input from the higher station apparatus 30, in the baseband signal processing section 204, via the transmission path interface 206.

In the baseband signal processing section 204, a downlink data channel signal is subject to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, as with signals of the physical downlink control channel, which is a downlink control channel, transmission processes such as channel coding and inverse fast Fourier transform are performed.

Also, the baseband signal processing section 204 reports control information for allowing the mobile terminal apparatus 10 to communicate with the base station apparatus 20, to the mobile terminal apparatuses 10 connected to the same cell, by a broadcast channel. The information for communication in the cell includes, for example, the uplink or downlink system bandwidth, identification information of a root sequence (root sequence index) for generating random access preamble signals in the PRACH (Physical Random Access Channel), and so on.

The baseband signal that is output from the baseband signal processing section 204 is converted into a radio frequency band in the transmitting/receiving section 203. The amplifying section 202 amplifies the radio frequency signal subjected to frequency conversion, and outputs the result to the transmitting/receiving antenna 201.

Meanwhile, as for signals to be transmitted on the uplink from the mobile terminal apparatus 10 to the base station apparatus 20, a radio frequency signal that is received in the transmitting/receiving antenna 201 is amplified in the amplifying section 202, subjected to frequency conversion and converted into a baseband signal in the transmitting/receiving section 203, and is input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signal received on the uplink. The decoded signal is transferred to the upper station apparatus 30 through the transmission path interface 206.

The call processing section 205 performs call processing such as setting up and releasing communication channels, manages the state of the base station apparatus 20 and manages the radio resources.

Figure 9:
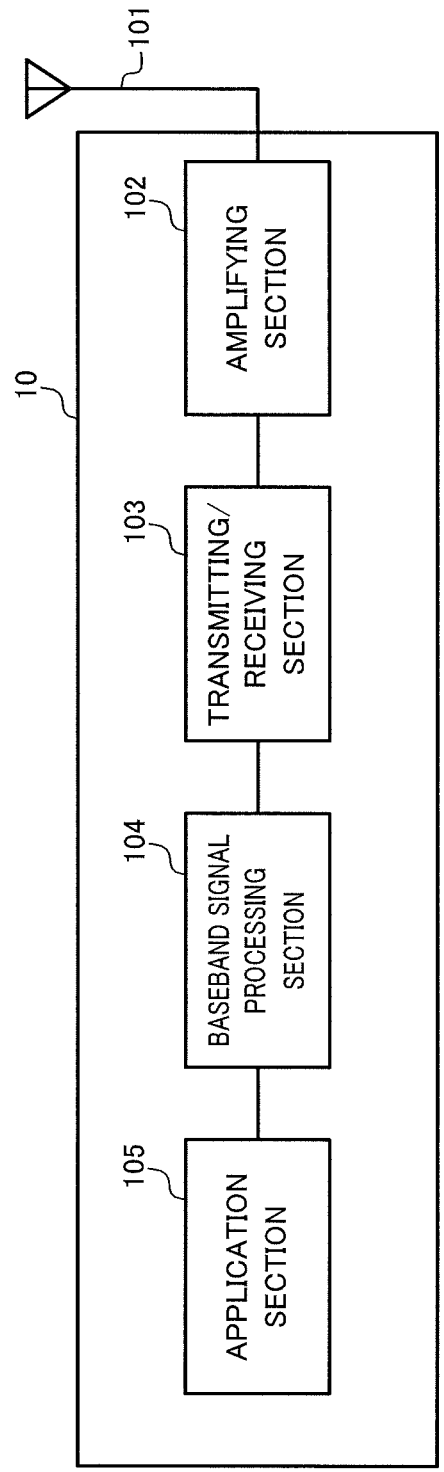
FIG. 9 is a diagram to explain an overall configuration of a mobile terminal apparatus

Next, referring to FIG. 9, an overall configuration of a mobile terminal apparatus according to the present embodiment will be described. An LTE terminal and an LTE-A terminal have the same hardware configurations in the principle parts, and therefore will be described indiscriminately. The mobile terminal apparatus 10 has a transmitting/receiving antenna 101, an amplifying section 102, a transmitting/receiving section (receiving section) 103, a baseband signal processing section 104, and an application section 105.

As for downlink data, a radio frequency signal received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to upper layers above the physical layer and the MAC layer. Also, in the downlink data, broadcast information is also transferred to the application section 105.

Meanwhile, uplink transmission data is input from the application section 105 to the baseband signal processing section 104. The baseband signal processing section 104 performs a mapping process, a retransmission control (HARQ) transmission process, channel coding, a DFT process, and an IFFT process. The baseband signal that is output from the baseband signal processing section 104 is converted into a radio frequency band in the transmitting/receiving section 103. After that, the amplifying section 102 amplifies the radio frequency signal having been subjected to the frequency conversion, and transmits the result from the transmitting/receiving antenna 101.

Figure 10:
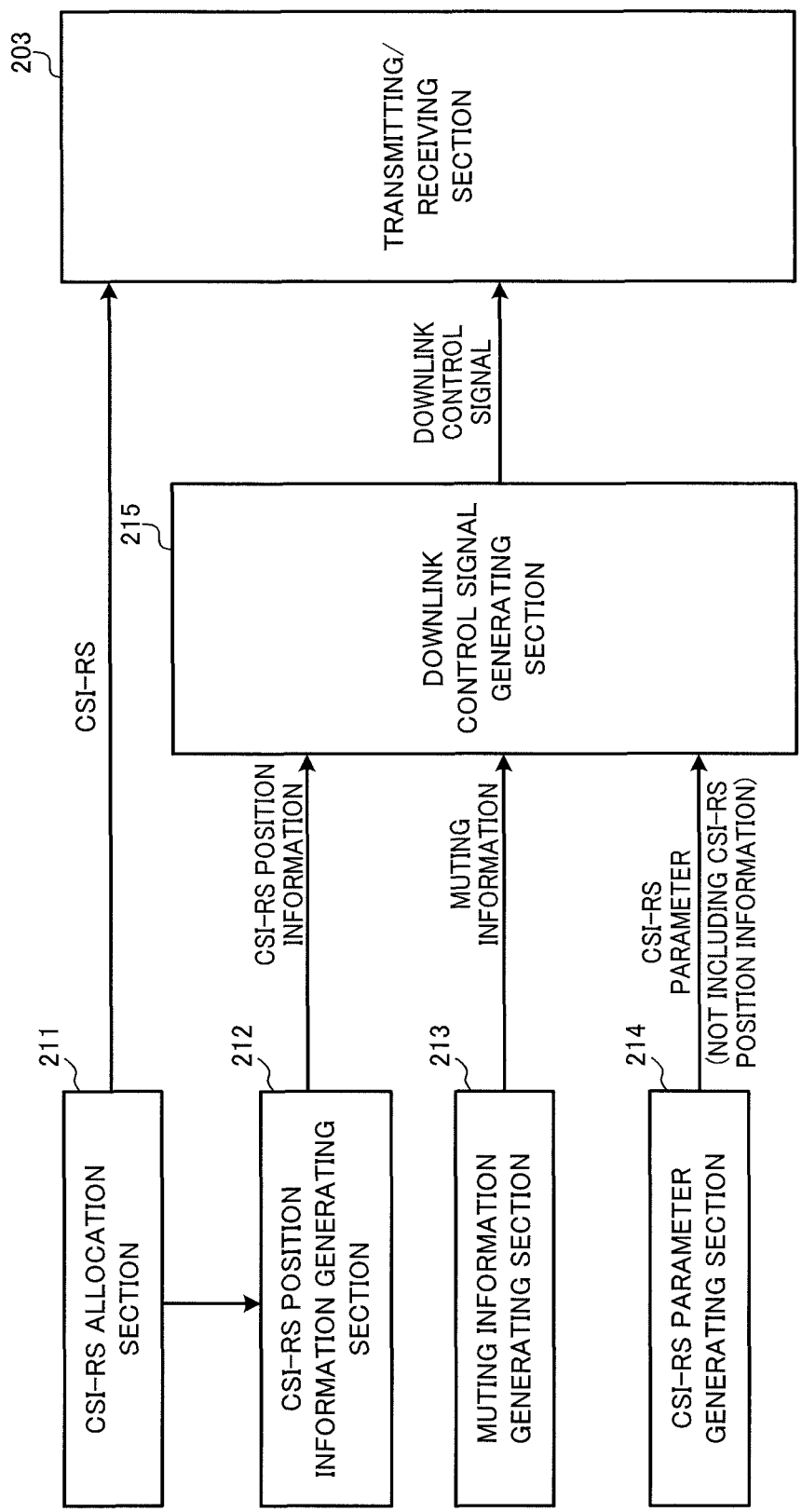
FIG. 10 is a function block diagram corresponding to the first reporting method by a base station apparatus.

The function blocks of a base station apparatus will be described with reference to FIG. 10. Note that the function blocks of FIG. 10 are primarily the processing content of the baseband processing section. Also, the function blocks of FIG. 10 are simplified, and assumed to have the configurations which a baseband processing section normally has.

With the first reporting method shown in FIG. 10, the base station apparatus 20 has a CSI-RS allocation section 211, a CSI-RS position information generating section 212, a muting information generating section 213, a CSI-RS parameter generating section 214, a downlink control signal generating section 215, and a transmitting/receiving section 203.

The CSI-RS allocation section 211 allocates CSI-RSs in accordance with the number of CSI-RS ports, to CSI-RS resources. The CSI-RS allocation section 211 arranges CSI-RSs in two resource elements for every one CSI-RS port, and thus increases the abundance ratio of CSI-RSs in one resource block. In this case, the CSI-RS allocation section 211 allocates CSI-RSs, in addition to the CSI-RSs which the second mobile terminal apparatus 10B is able to receive, so that the accuracy of measurement in the first mobile terminal apparatus 10A increases.

Also, the CSI-RS allocation section 211 acquires CSI-RS position information from neighboring cells, and, avoiding the CSI-RSs of the neighboring cells, allocates additional CSI-RSs. By this means, even when the abundance ratio of CSI-RSs in one resource block is increased, the interference of CSI-RSs between neighboring cells is reduced.

The CSI-RS position information generating section 212 generates position information of the CSI-RSs allocated by the CSI-RS allocation section 211. The CSI-RS position information includes the transmission period (duty cycle), subframe offset and so on, in addition to the resources where CSI-RSs are allocated. The resources where CSI-RSs are allocated are specified by CSI configurations, bitmap information and so on. The position information of the CSI-RSs is input in the downlink control signal generating section 215 as one of the CSI-RS parameters.

The muting information generating section 213 generates muting information, which indicates that the resources where additional CSI-RSs are allocated are muted. The resources shown in the muting information are in fact allocated CSI-RSs, and are not muted. For the muting information, bitmap information, CSI configurations and so on are generated. The muting information is input in the downlink control signal generating section 215.

The CSI-RS parameter generating section 214 generates parameters other than CSI-RS position information, such as a sequence and transmission power of CSI-RSs, and so on. The CSI-RS parameters generated in the CSI-RS parameter generating section 214 are input in the downlink control signal generating section 215.

With respect to the first mobile terminal apparatus 10A, the downlink control signal generating section 215 generates downlink control signals including CSI-RS position information and CSI-RS parameters. By this means, all the resources where CSI-RSs are allocated separately reported to the first mobile terminal apparatus 10A. Also, with respect to the second mobile terminal apparatus 10B, the downlink control signal generating section 215 generates downlink control signals including CSI-RS position information, CSI-RS parameters and muting information. By this means, the second mobile terminal apparatus 10B recognizes additional CSI-RSs as resources to be muted, and part of the CSI-RS resources that can be received are separately reported. The transmitting/receiving section 203 transmits the CSI-RSs and downlink control signals to the first and second mobile terminal apparatuses 10A and 10B.

Figure 11:
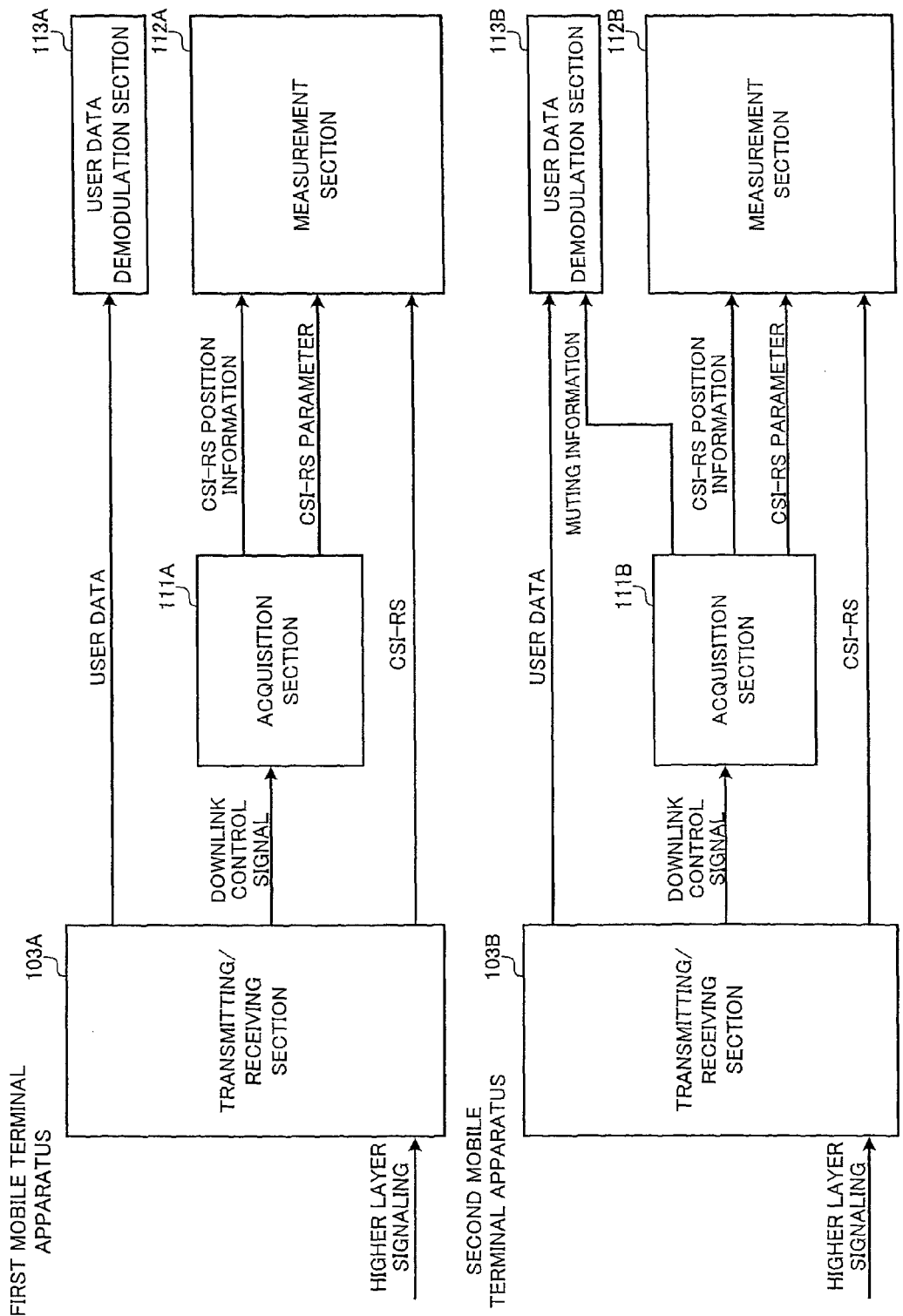
FIG. 11 is a function block diagram showing the first reporting method by the first and second mobile terminal apparatuses.

The function blocks of the first and second mobile terminal apparatuses will be described with reference to FIG. 11. Note that the function blocks of FIG. 11 are primarily the processing content of the baseband processing section. Also, the function blocks of FIG. 11 are simplified, and assumed to have the configurations which a baseband processing section normally has.

As shown in FIG. 11, the first mobile terminal apparatus 10A has a transmitting/receiving section 103A, an acquisition section 111A, a measurement section 112A, and a user data demodulation section 113A. The transmitting/receiving section 103A receives CSI-RSs and a downlink control signal from the base station apparatus 20. The acquisition section 111A demodulates the downlink control signal and analyzes the content of the signal, and, by this means, acquires CSI-RS position information and CSI-RS parameters.

The measurement section 112A measures CSI from parameters such as CSI-RS position information, sequence, transmission power and so on. In this case, all the resources where CSI-RSs are allocated are reported from the base station apparatus 20, so that the measurement section 112A is able to measure CSI with high accuracy. The user data demodulation section 113 demodulates the user data received via the transmitting/receiving section 103. Note that the first mobile terminal apparatus 10A may be configured to receive the CSI-RS position information and CSI-RS parameters by higher layer signaling.

Also, the second mobile terminal apparatus 10B has transmitting/receiving section 103B, an acquisition section 111B, a measurement section 112B, and a user data demodulation section 113B. The transmitting/receiving section 103B receives CSI-RSs and a downlink control signal from the base station apparatus 20. The acquisition section 111B demodulates the downlink control signal and analyzes the content of the signal, and, by this means, acquires CSI-RS position information, CSI-RS parameters and muting information.

The measurement section 112B measures CSI from parameters such as CSI-RS position information, sequence, transmission power and so on. The user data demodulation section 113B demodulates the user data received via the transmitting/receiving section 103B. In this case, the user data demodulation section 113B recognizes the resources where additional CSI-RSs are allocated as resources to be muted, by the muting information reported from the base station apparatus 20. Consequently, the user data demodulation section 113B does not demodulate the additional CSI-RSs, so that the throughput of the demodulation process and the accuracy of demodulation are improved. Note that the second mobile terminal apparatus 10B may be configured to receive CSI-RS position information, CSI-RS parameters and muting information by higher layer signaling.

Figure 12:
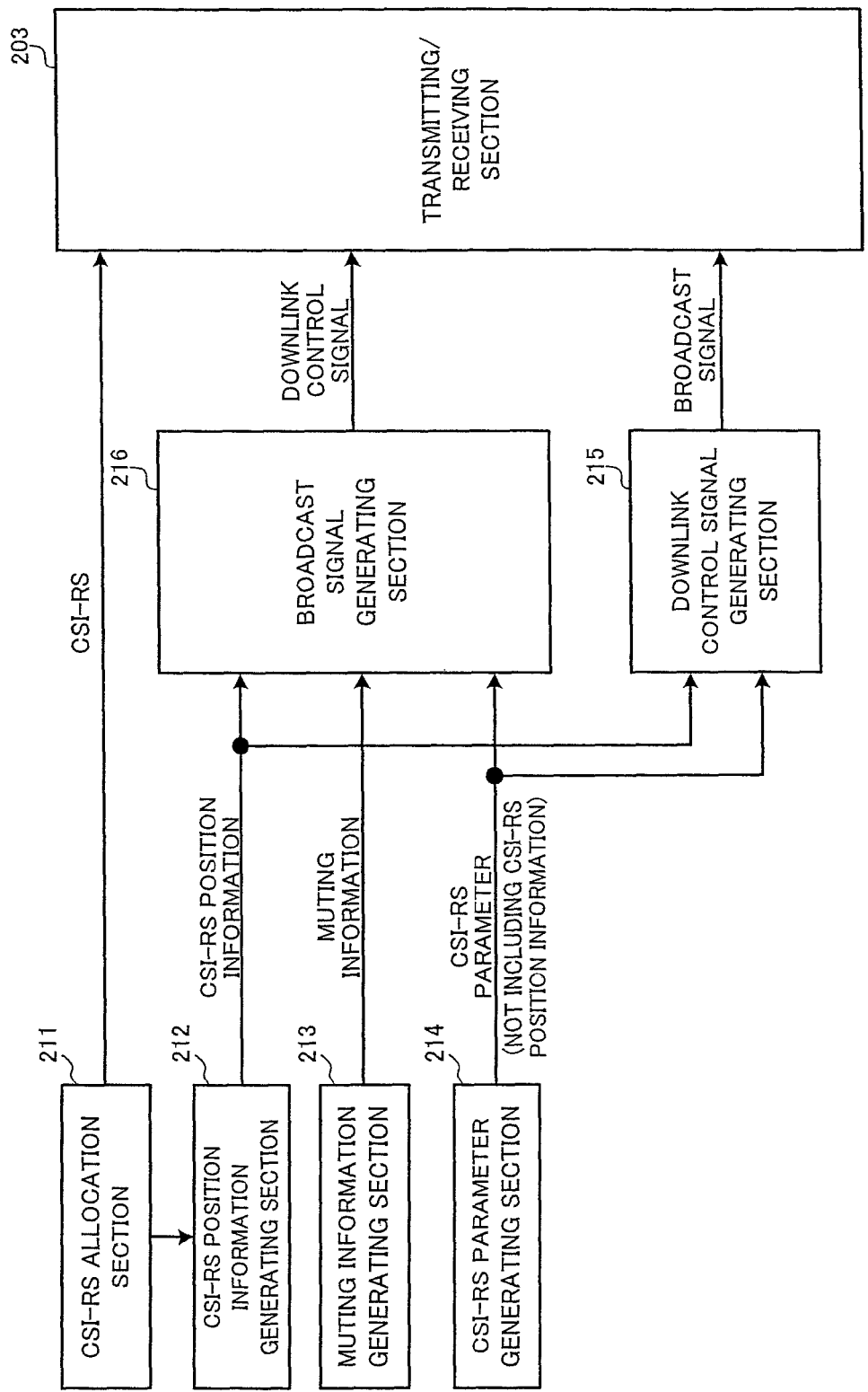
FIG. 12 is a function block diagram corresponding to a second reporting method by a base station apparatus.

Now, the function blocks of a base station apparatus will be described with reference to FIG. 12. Note that the function blocks of FIG. 12 are primarily the processing content of the baseband processing section. Also, the function blocks of FIG. 12 are simplified, and assumed to have the configurations which a baseband processing section normally has. Also, blocks in FIG. 12 having the same names as in FIG. 10 will be assigned the same codes as in FIG. 10 and described.

With the second reporting method shown in FIG. 12, the base station apparatus 20 has a CSI-RS allocation section 211, a CSI-RS position information generating section 212, a muting information generating section 213, a CSI-RS parameter generating section 214, a broadcast signal generating section 216, a downlink control signal generating section 215, and a transmitting/receiving section 203.

The CSI-RS allocation section 211 allocates CSI-RSs to CSI-RS resources in accordance with the number of CSI-RS ports. The CSI-RS allocation section 211 arranges CSI-RSs in two resource elements for every one CSI-RS port, and thus increases the abundance ratio of CSI-RSs in one resource block. In this case, the CSI-RS allocation section 211 allocates CSI-RSs, in addition to the CSI-RSs which the second mobile terminal apparatus 10B is able to receive, so that the accuracy of measurement in the first mobile terminal apparatus 10A increases.

Also, the CSI-RS allocation section 211 acquires CSI-RS position information from neighboring cells, and, avoiding the CSI-RSs of the neighboring cells, allocates additional CSI-RSs. By this means, even when the abundance ratio of CSI-RSs in one resource block is increased, the interference of CSI-RSs between neighboring cells is reduced.

The CSI-RS position information generating section 212 generates position information of the CSI-RSs allocated by the CSI-RS allocation section 211. The CSI-RS position information includes the transmission period (duty cycle), subframe offset and so on, in addition to the resources where CSI-RSs are allocated. The resources where CSI-RSs are allocated are specified by CSI configurations, bitmap information and so on. The position information of the CSI-RSs is input in the broadcast signal generating section 216 and downlink control signal generating section 215, as one of the CSI-RS parameters.

The muting information generating section 213 generates muting information, which indicates that the resources where additional CSI-RSs are allocated are muted. The resources shown in the muting information are in fact allocated CSI-RSs, and are not muted. For the muting information, bitmap information, CSI configurations and so on are generated. The muting information is input in the downlink control signal generating section 215.

The CSI-RS parameter generating section 214 generates parameters other than CSI-RS position information, such as a sequence and transmission power of CSI-RSs, and so on. The CSI-RS parameters generated in the CSI-RS parameter generating section 214 are input in the broadcast signal generating section 216 and the downlink control signal generating section 215.

For the first and second mobile terminal apparatuses 10A and 10B, the broadcast signal generating section 216 generates broadcast signals including position information of the CSI-RSs which the second mobile terminal apparatus 10B can receive, CSI-RS parameters, and muting information with respect to additional CSI-RSs. By this means, the first and second mobile terminal apparatuses 10A and 10B recognize the additional CSI-RSs as resources to be muted, and the resources of part of the CSI-RSs are reported together.

For the first mobile terminal apparatus 10A, the downlink control signal generating section 215 generates downlink control signals including position information of the additional CSI-RSs and CSI-RS parameters. By this means, the first mobile terminal apparatus 10A is able to recognize the CSI-RSs of the resource to be muted. The transmitting/receiving section 203 transmits the CSI-RSs and downlink control signals to the first and second mobile terminal apparatuses 10A and 10B.

Figure 13:
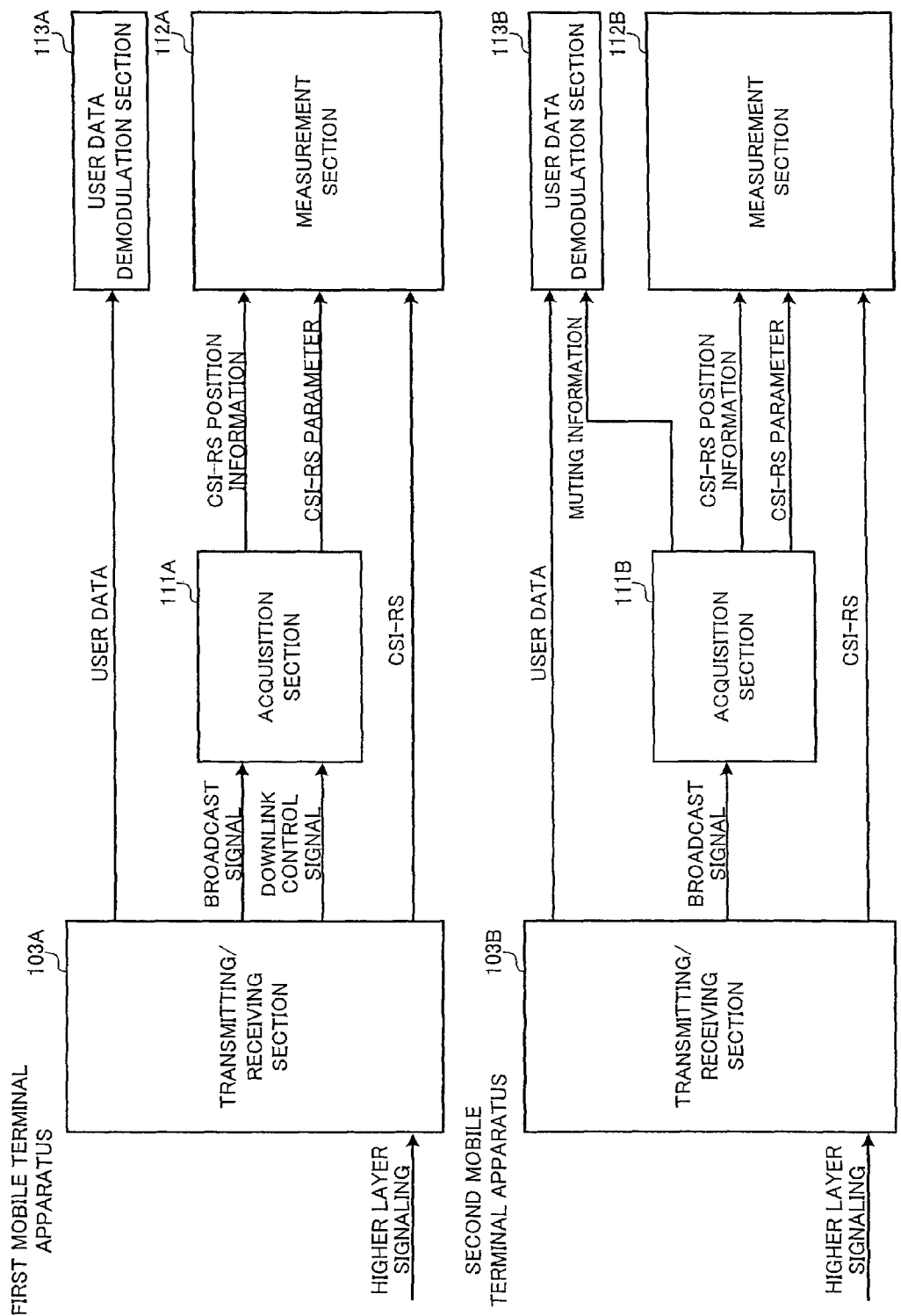
FIG. 13 is a function block diagram corresponding to a second reporting method by the first and second mobile terminal apparatuses.

The function blocks of the first and second mobile terminal apparatuses will be described with reference to FIG. 13. Note that the function blocks of FIG. 13 are primarily the processing content of the baseband processing section. Also, the function blocks of FIG. 13 are simplified, and assumed to have the configurations which a baseband processing section normally has. Also, blocks in FIG. 13 having the same names as in FIG. 11 will be assigned the same codes as in FIG. 11 and described.

As shown in FIG. 13, the first mobile terminal apparatus 10A has a transmitting/receiving section 103A, an acquisition section 111A, a measurement section 112A, and a user data demodulation section 113A.

The transmitting/receiving section 103A receives CSI-RSs, a broadcast signal, and a downlink control signal from the base station apparatus 20. The acquisition section 111A demodulates the broadcast signal and analyzes the content of the signal, and, by this means, acquires position information of the CSI-RSs which the second mobile terminal apparatus 10B can receive, the CSI-RS parameters, and muting information with respect to additional CSI-RSs. Also, the acquisition section 111A demodulates the downlink control signal and analyzes the content of the signal, and, by this means, acquires position information of the additional CSI-RSs and the CSI-RS parameters. By this means, the first mobile terminal apparatus 10A recognizes that CSI-RSs are allocated to the resources shown in the muting information.

The measurement section 112A measures CSI from parameters such as CSI-RS position information, sequence, transmission power and so on. In this case, all the resources where CSI-RSs are allocated are reported from the base station apparatus 20, so that the measurement section 112A is able to measure CSI with high accuracy. The user data demodulation section 113A demodulates the user data received via the transmitting/receiving section 103A. Note that the first mobile terminal apparatus 10A may be configured to receive the CSI-RS position information and CSI-RS parameters by higher layer signaling.

Also, the second mobile terminal apparatus 10B has a transmitting/receiving section 103B, an acquisition section 111B, a measurement section 112B, and a user data demodulation section 113B. The transmitting/receiving section 103A receives CSI-RSs and a broadcast signal from the base station apparatus 20. The acquisition section 111B demodulates the broadcast signal and analyzes the content of the signal, and, by this means, acquires position information of the CSI-RSs which the second mobile terminal apparatus 10B can receive, the CSI-RS parameters, and muting information with respect to additional CSI-RSs.

The measurement section 112B measures CSI from parameters such as CSI-RS position information, sequence, transmission power and so on. The user data demodulation section 113B demodulates the user data received via the transmitting/receiving section 103B. In this case, the user data demodulation section 113B recognizes the resources where additional CSI-RSs are allocated as resources to be muted, by the muting information reported from the base station apparatus 20. Consequently, the user data demodulation section 113B does not demodulate the additional CSI-RSs, so that the throughput of the demodulation process and the accuracy of demodulation are improved. Note that the second mobile terminal apparatus 10B may be configured to receive CSI-RS position information, CSI-RS parameters and muting information by higher layer signaling.

As described above, with the base station apparatus 20 according to the present embodiment, the first mobile terminal apparatus 10A is able to receive all the CSI-RSs that are allocated at a high abundance ratio in one radio resource, and measure the channel state with high accuracy. Also, the second mobile terminal apparatus 10B is able to disregard the CSI-RSs of muted resources, among the CSI-RSs allocated at an abundance ratio which the first mobile terminal apparatus 10A can receive, and measure the channel state. Consequently, the second mobile terminal apparatus is not influenced by the increase of the abundance ratio of CSI-RSs. In this way, even when the first mobile terminal apparatus 10A and the second mobile terminal apparatus 10B coexist, it is still possible to adequately transmit and receive CSI-RSs.

Note that, although the above-described embodiment have shown examples of the first and second reporting methods, the method of reporting CSI-RS position information is by no means limited to these. The method of reporting CSI-RS position information may be any method as long as all the resources where CSI-RSs are allocated are reported to the first mobile terminal apparatus, and, when the resources where CSI-RSs are allocated are reported to the second mobile terminal apparatus, part of the resources is reported as resources to be muted.

Also, although the above embodiment is configured such that, in a mobile terminal apparatus, an acquisition section receives CSI-RS position information, muting information, and CSI-RS parameters, this configuration is by no means limiting. Such configurations are equally possible, in which CSI-RS position information, muting information, and CSI-RS parameters are acquired by function blocks other than an acquisition section, such as, for example, a measurement section a user data demodulation section, and so on.

Also, although the above embodiment has shown the CSI-RS as an example of a reference signal, this is by no means limiting. The reference signal has only to be used to measure the channel state. Also, CSI has only to include at least one of CQI, PMI, and RI.

The present invention is by no means limited to the above embodiment and can be implemented in various modifications. For example, without departing from the scope of the present invention, it is possible to adequately change, in the above description, the positions to set CSI-RSs, the positions to set muting, the number of processing sections, the order of steps, the number of CSI-RSs, and the count of muting, and implement these. Besides, the present invention can be implemented with various changes, without departing from the scope of the present invention.

The disclosure of Japanese Patent Application No. 2010-286568, filed on Dec. 22, 2010, including the specification, drawings and abstract, is incorporated herein by reference in its entirety.

The invention claimed is:

1. A base station apparatus that transmits reference signals to a first mobile terminal apparatus which receives a reference signal for measuring a channel state, and to a second mobile terminal apparatus which receives a reference signal that is set in a predetermined period at a lower abundance ratio than the first mobile terminal apparatus, the base station apparatus comprising:
   a reference signal allocation section that allocates the reference signals, to reference signal resources which are defined for transmission of the reference signals and which can be muted, at an abundance ratio which allows the first mobile terminal apparatus reception; and
   a reference signal reporting section that reports resources where the reference signals are allocated, to the first mobile terminal apparatus, and that, when reporting the resources where the reference signals are allocated, to the second mobile terminal apparatus, reports part of the resources as resources to be muted.

2. The base station apparatus according to claim 1, wherein, to the first mobile terminal apparatus, the reference signal reporting section individually reports the resources where the reference signals are allocated, and, when reporting the resources where the reference signals are allocated to the second mobile terminal apparatus, reports part of the resources as resources to be muted.

3. The base station apparatus according to claim 2, wherein the reference signal reporting section reports the resources to be muted in a bitmap format, which associates the reference signal resources and positions to set the resources to be muted.

4. The base station apparatus according to claim 1, wherein, when reporting the resources where the reference signals are allocated to the first mobile terminal apparatus and the second mobile terminal apparatus together, the reference signal reporting section reports part of the resources as resource to be muted, and reports, to the first mobile terminal apparatus, individually, that the reference signals are allocated to the resources reported as resources to be muted.

5. The base station apparatus according to claim 4, wherein the reference signal reporting section reports the resources to be muted in a bitmap format, which associates the reference signal resources and positions to set the resources to be muted.

6. The base station apparatus according to claim 1, wherein the reference signal reporting section reports the resources to be muted in a bitmap format, which associates the reference signal resources and positions to set the resources to be muted.

7. The base station apparatus according to claim 1, further comprising a muting information generating section that generates muting information which allows the second mobile terminal apparatus to recognize part of the reference signal resources as resources to be muted,
   wherein the reference signal allocation section allocates the reference signals to the reference signal resources at a low abundance ratio to allow the second mobile terminal apparatus reception, and allocates the reference signals to the reference signal resources at a high abundance ratio by allocating the reference signals to the resources shown in the muting information.

8. A mobile terminal apparatus that is connected to a base station apparatus with another mobile terminal apparatus which receives a reference signal to be used to measure a channel state, and that receives a reference signal that is set in a predetermined period at a higher abundance ratio than the other mobile terminal apparatus, the mobile terminal apparatus comprising:
   a receiving section that receives, from the base station apparatus that allocates the reference signals to reference signal resources which are defined for transmission of the reference signals and which can be muted, at a higher abundance ratio than the other mobile terminal apparatus, and that, upon reporting the resources where the reference signals are allocated to the other mobile terminal apparatus, reports part of the resources as resources to be muted, reporting of the resources where the reference signals are allocated; and
   a measurement section that measures a downlink channel state based on the reference signals.

9. A communication control method in a base station apparatus that transmits reference signals to a first mobile terminal apparatus which receives a reference signal for measuring a channel state, and to a second mobile terminal apparatus which receives a reference signal that is set in a predetermined period at a lower abundance ratio than the first mobile terminal apparatus, the communication control method comprising the steps of:
  allocating the reference signals, to reference signal resources which are defined for transmission of the reference signals and which can be muted, at an abundance ratio which allows the first mobile terminal apparatus reception; and
  reporting resources where the reference signals are allocated, to the first mobile terminal apparatus, and, when reporting the resources where the reference signals are allocated, to the second mobile terminal apparatus, reporting part of the resources as resources to be muted.

* * * * *